(12) United States Patent
Lu (10) Patent No.: US 10,295,013 B2
(45) Date of Patent: May 21, 2019

(54) DAMPING MECHANISM OF CAMERA TRIPOD HEAD

(71) Applicant: NINGBO EIMAGE STUDIO EQUIPMENT CO., LTD, Ningbo, Zhejiang (CN)

(72) Inventor: Qi Lu, Zhejiang (CN)

(73) Assignee: NINGBO EIMAGE STUDIO EQUIPMENT CO., LTD., Ningbo, Zhejiang (CN)

( * ) Notice: Subject to any disclaimer, the term of this patent is extended or adjusted under 35 U.S.C. 154(b) by 129 days.

(21) Appl. No.: 15/658,619

(22) Filed: Jul. 25, 2017

(65) Prior Publication Data

US 2018/0195576 A1 Jul. 12, 2018

(30) Foreign Application Priority Data

Jan. 11, 2017 (CN) ..................... 2017 2 0033500 U (51) Int. Cl.
| | |
|---|---|
| *G03B 17/56* | (2006.01) |
| *F16F 15/12* | (2006.01) |
| *F16F 15/121* | (2006.01) |
| *F16M 11/12* | (2006.01) |
| *F16M 11/04* | (2006.01) |
| *F16M 11/08* | (2006.01) |
| *F16M 11/16* | (2006.01) |

(52) U.S. Cl.
CPC ........ *F16F 15/1207* (2013.01); *F16F 15/121* (2013.01); *F16M 11/041* (2013.01); *F16M 11/08* (2013.01); *F16M 11/126* (2013.01); *F16M 11/16* (2013.01); *G03B 17/561* (2013.01); *F16M 2200/022* (2013.01); *F16M 2200/024* (2013.01)

(58) Field of Classification Search
CPC ......... F16F 15/12; F16M 11/04; F16M 11/08; F16M 11/12; F16M 11/16; G03B 17/56
USPC ......................................... 396/419; 74/574.3
See application file for complete search history.

(56) References Cited

U.S. PATENT DOCUMENTS

| | | | | |
|---|---|---|---|---|
| 4,226,303 | A * | 10/1980 | Thoma ...................... | F16F 9/12 188/322.5 |
| 2008/0258022 | A1* | 10/2008 | Jaumann ................ | F16M 11/10 248/183.4 |
| 2010/0259671 | A1* | 10/2010 | Lindsay ............... | F16M 11/041 348/373 |

(Continued)

*Primary Examiner* — Clayton E. LaBalle
*Assistant Examiner* — Fang-Chi Chang
(74) *Attorney, Agent, or Firm* — Charles C. Achkar; Ostrolenk Faber LLP.

(57) ABSTRACT

A damping mechanism of a camera tripod head includes a fixing seat, a spindle connected to the fixing seat, damping devices fitted on the spindle, and a rotary seat. Each damping device includes a damping disc, a stop block fitted on the spindle, and a drive device for pushing the stop block to slide along the spindle. The damping disc includes an inner ring and an outer ring. The stop block is movable to disengage from the inner ring of the damping disc by the drive device. The drive device includes a push lever, a seesaw plate hinged to the fixing seat, and a cam mounted on the fixing seat. One end of the push lever leans against the stop block. One end of the seesaw plate leans against another end of the push lever. Another end of the seesaw plate leans against the cam.

10 Claims, 7 Drawing Sheets

(56) References Cited

U.S. PATENT DOCUMENTS

2012/0205516 A1* 8/2012 Jaumann ................. F16F 9/12
                   248/636

* cited by examiner

DAMPING MECHANISM OF CAMERA TRIPOD HEAD

CROSS REFERENCE TO RELATED APPLICATION

The present application claims priority to Chinese Application No. 201720033500.4, filed on Jan. 11, 2017, the subject matter of which is incorporated by reference in its entirety.

FIELD OF THE INVENTION

The present invention relates to a camera tripod head, and more particularly to a damping mechanism of a camera tripod head.

BACKGROUND OF THE INVENTION

A tripod head is a support apparatus for supporting a camera. In general, the tripod head is mounted on a tripod. Through the tripod head, it is possible to adjust the shooting angle and height. When in use, the tripod head is secured on a tripod, and the camera or the like is secured on the tripod head. Through the tripod head, the horizontal and pitching angle of the camera can be adjusted to achieve the best working condition, and then the adjustment mechanism of the tripod head is locked.

A conventional tripod head includes a main seat mounted on a tripod. The main seat is provided with a side cover. The side cover is rotatable about the main seat. A damping mechanism is provided between the main seat and the side cover. A conventional damping mechanism comprises a plurality of damping discs, a damping shaft, and a drive device for driving the damping shaft to slide. Each damping disc is formed with a damping hole. The damping shaft is inserted in the damping holes of the damping discs in sequence under the action of the drive device. This damping mechanism needs to pass through the damping holes in sequence. As a result, it is not easy to control the engagement, and it may have a jammed phenomenon to damage the parts. Sometimes, the outer ring cannot be turned to affect the operation of the tripod head. Accordingly, the inventor of the present invention has devoted himself based on his many years of practical experiences to solve these problems.

SUMMARY OF THE INVENTION

In view of the problems of the prior art, the primary object of the present invention is to provide a damping mechanism of a camera tripod head, which can be shifted conveniently and accurately and won't be damaged easily.

In order to achieve the aforesaid object, a damping mechanism of a camera tripod head is provided. The damping mechanism comprises a fixing seat, a spindle fixedly connected to a middle portion of the fixing seat, a plurality of damping devices fitted on the spindle in order, and a rotary seat disposed coaxially with the fixing seat. The rotary seat is rotated about an axis of the spindle. Each damping device comprises a damping disc, a stop block fitted on the spindle, and a drive device for pushing the stop block to slide along the spindle. The damping disc includes an inner ring connected with the stop block and an outer ring fixedly connected with the rotary seat. The stop block is movable to disengage from the inner ring of the damping disc under the action of the drive device. The drive device includes a push lever for pushing the stop block to slide, a seesaw plate having a middle portion hinged to the fixing seat, and a cam mounted on the fixing seat through a fixing shaft. One end of the push lever leans against the stop block. The cam is turned about an axis of the fixing shaft. One end of the seesaw plate leans against another end of the push lever. Another end of the seesaw plate leans against the cam.

Preferably, each damping device further includes a fixing block fixedly connected to the spindle. The stop block is disposed between the damping disc and the fixing block. A spring is provided between the stop block and the fixing block. The stop block is movable to slide along the spindle under the action of the spring to engage with the inner ring of the damping disc.

Preferably, the damping disc includes at least two outer rings and at least one inner ring. The inner ring is disposed between the two outer rings. The outer rings are fixedly connected to the rotary seat. The inner ring is fixedly connected to a positioning ring by rivets.

Preferably, the stop block is evenly formed with a plurality of first bevel teeth. The positioning ring of the damping disc is evenly formed with a plurality of second bevel teeth to mesh with the first bevel teeth.

Preferably, the stop block is coaxially provided with a positioning collar. The positioning ring is formed with a positioning hole to mate with the positioning collar.

Preferably, the end of the seesaw plate, leaning against the cam, is hingedly connected with a roller. An outer surface of the roller extends beyond the seesaw plate to lean against the cam.

Preferably, the stop block is provided with a slide shaft. The fixing block is formed with a slide hole. The slide shaft is inserted in the slide hole.

Preferably, the fixing block is threadedly connected with a pin. The pin leans against an outer circumferential surface of the slide shaft.

Preferably, a locking device is provided between the rotary seat and the fixing seat. The locking device includes a locking disc fixedly connected to the rotary seat and a locking block connected to the fixing seat by an adjustment screw. The locking block is formed with a locking trough. The locking disc is inserted in the locking trough. The locking trough has a width greater than that of the locking disc.

Preferably, the seesaw plate of each drive device is hinged to the fixing seat through a mounting shaft. A partition is provided between two adjacent seesaw plates.

Compared to the prior art, the damping mechanism of the present invention has the following benefits. Each damping device has a corresponding damping force. When it is necessary to adjust the damping force, only the corresponding cam is turned. Multiple cams can be simultaneously turned to achieve different damping forces.

DESCRIPTION OF THE PREFERRED EMBODIMENTS

Advantages and features of the inventive concept and methods of accomplishing the same may be understood more readily by reference to the following detailed description of embodiments and the accompanying drawings. The inventive concept may, however, be embodied in many different forms and should not be construed as being limited to the embodiments set forth herein.

Figure 1:
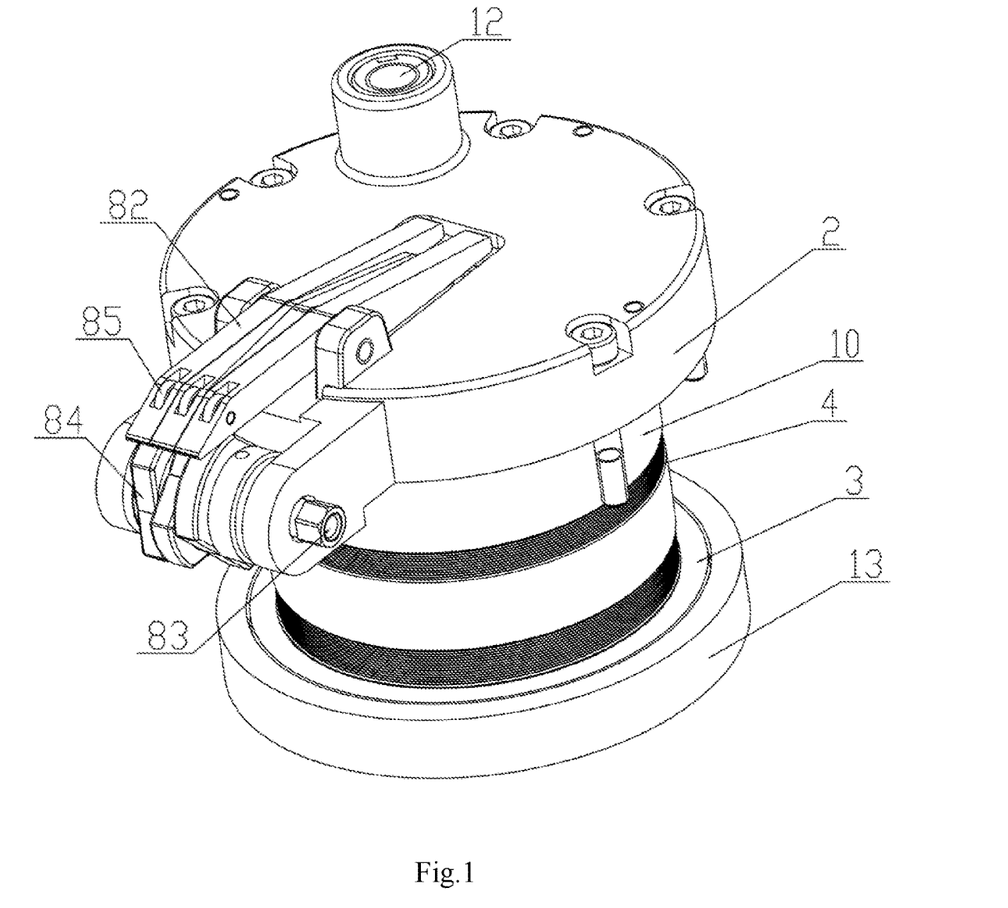
FIG. 1 is a perspective view of the damping mechanism of the camera tripod head of the present invention.
Figure 2:
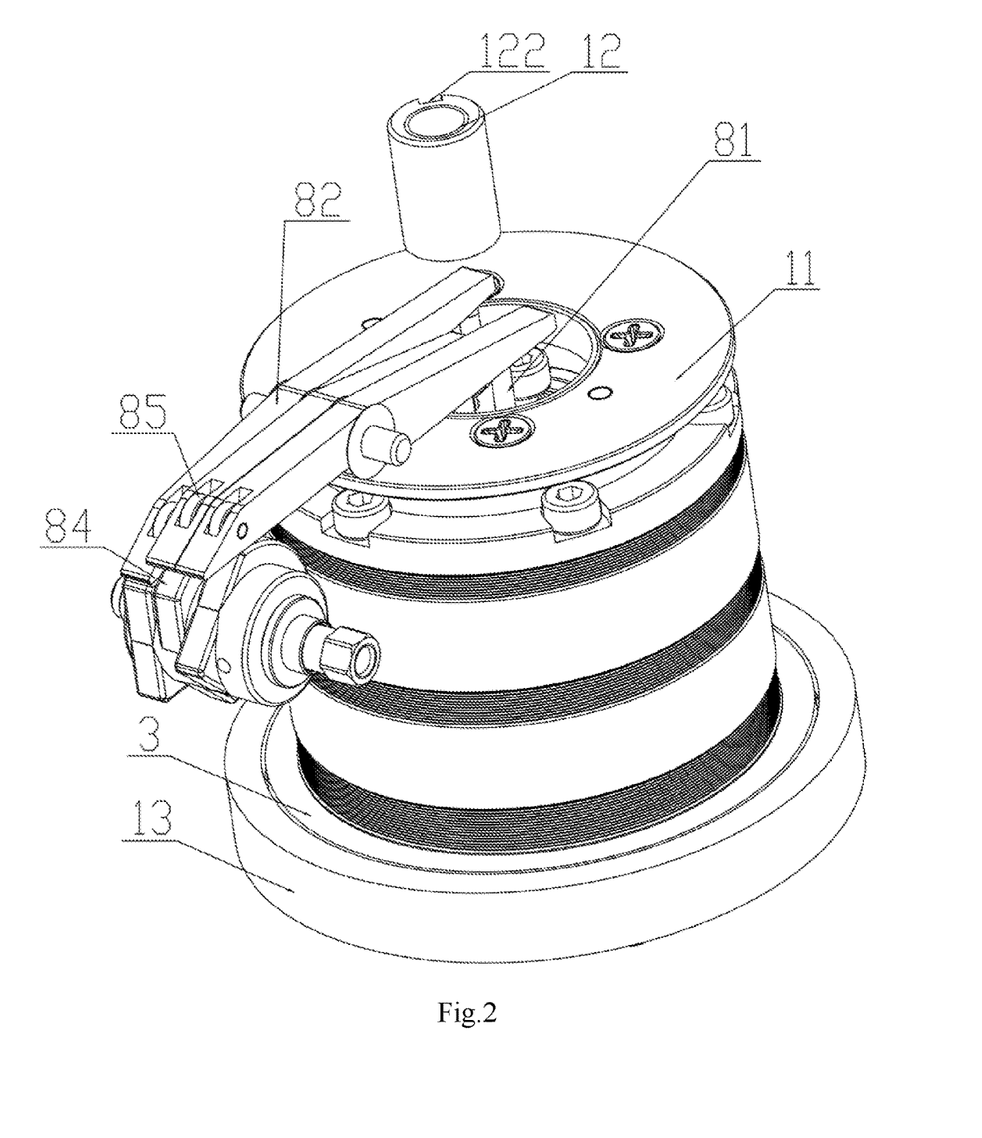
FIG. 2 is a perspective view of the damping mechanism of the camera tripod head, without the fixing seat, of the present invention.
Figure 3:
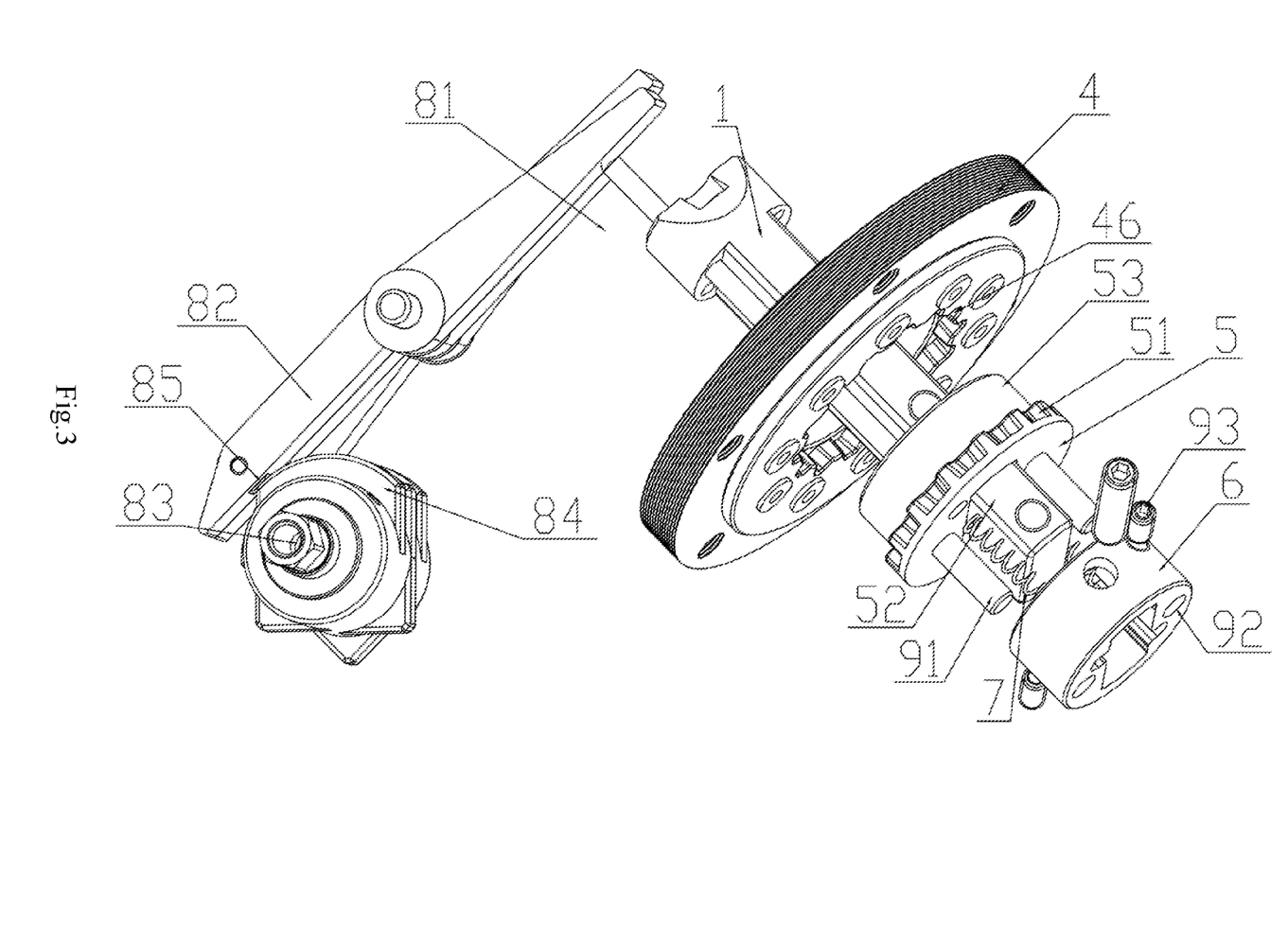
FIG. 3 is an exploded view of the damping device of the damping mechanism of the camera tripod head of the present invention.
Figure 4:
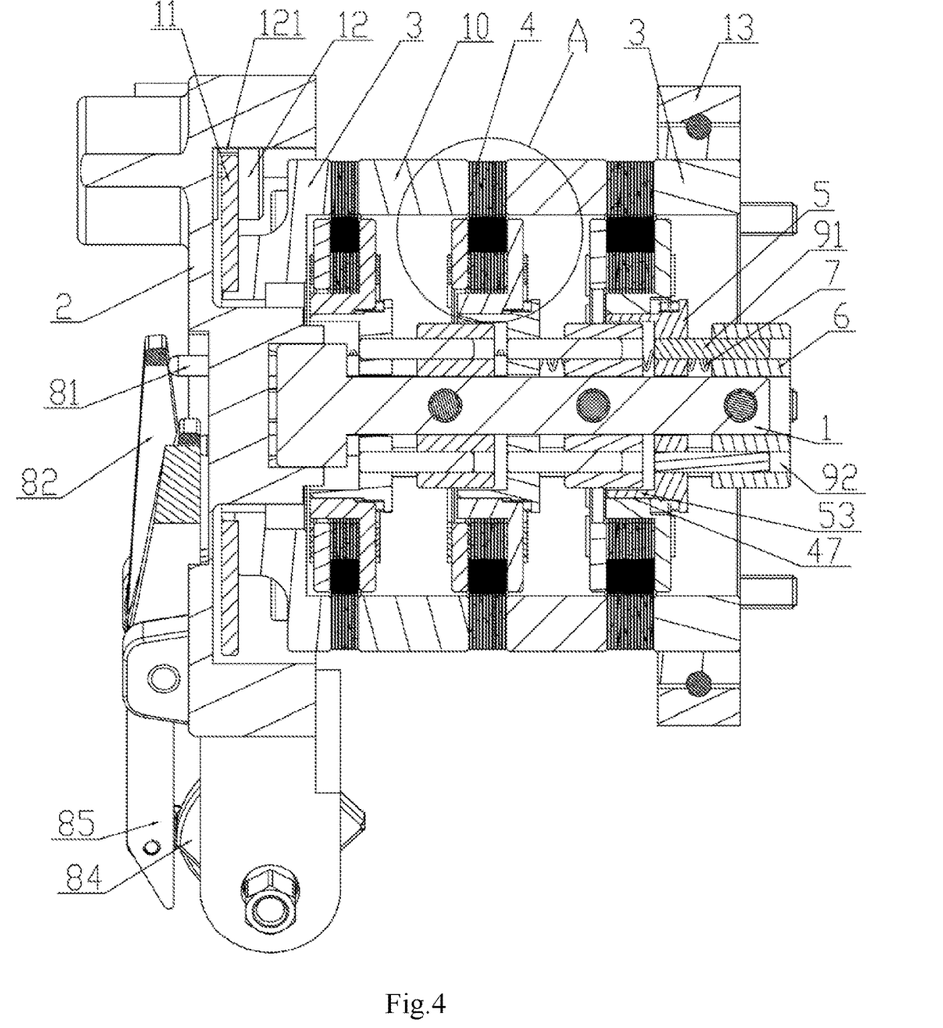
FIG. 4 is a lateral sectional view of the damping mechanism of the camera tripod head of the present invention.

As shown in FIG. 1 and FIG. 2, the present invention discloses a damping mechanism of a camera tripod head. FIG. 3 is an exploded view of the damping device of the damping mechanism. FIG. 4 is a lateral sectional view of the damping mechanism. The damping mechanism of the present invention comprises a fixing seat 2, a spindle 1 fixedly connected to a middle portion of the fixing seat 2, a plurality of damping devices fitted on the spindle 1 in order, and a rotary seat 3 disposed coaxially with the fixing seat 2. The rotary seat 3 is rotated about an axis of the spindle 1. The fixing seat 2 is fixedly connected to the aforesaid main seat. The rotary seat 3 is fixedly connected to the aforesaid side cover. Each of the damping devices comprises a damping disc 4, a stop block 5 fitted on the spindle 1, and a drive device for pushing the stop block 5 to slide along the spindle 1. The damping disc 4 includes an inner ring 42 connected with the stop block 5 and an outer ring 41 fixedly connected with the rotary seat 34. Under the action of the drive device, the stop block 5 is driven to disengage from the inner ring 42 of the damping disc 4. The drive device includes a push lever 81 for pushing the stop block 5 to slide, a seesaw plate 82 having a middle portion hinged to the fixing seat 2, and a cam 84 mounted on the fixing seat 2 through a fixing shaft 83. One end of the push lever 81 leans against the stop block 5. The cam 84 is turned about an axis of the fixing shaft 83. One end of the seesaw plate 82 leans against another end of the push lever 81, and another end of the seesaw plate 82 leans against the cam 84.

The cam may be in a different shape, just with two radii of different sizes. The difference between the two radii of different sizes is sufficient to disengage the stop block from the inner ring, allowing the shift to be accurately adjusted.

Each damping device further includes a fixing block 6 fixedly connected to the spindle 1. The stop block 5 is disposed between the damping disc 4 and the fixing block 6. A spring 7 is provided between the stop block 5 and the fixing block 6. The stop block 5 is movable to slide along the spindle 1 under the action of the spring 7 to engage with the inner ring 42 of the damping disc 4 to facilitate the stop block to reset and restore the damping force.

The fixing block 6 is fixedly connected to the spindle 1 by screws.

The spring 7 may be plural, and the springs are evenly arranged. The fixing block 6 is formed with mounting holes for receiving the springs 7 so as to avoid deformation of the springs and to ensure the normal use of the springs.

Figure 5:
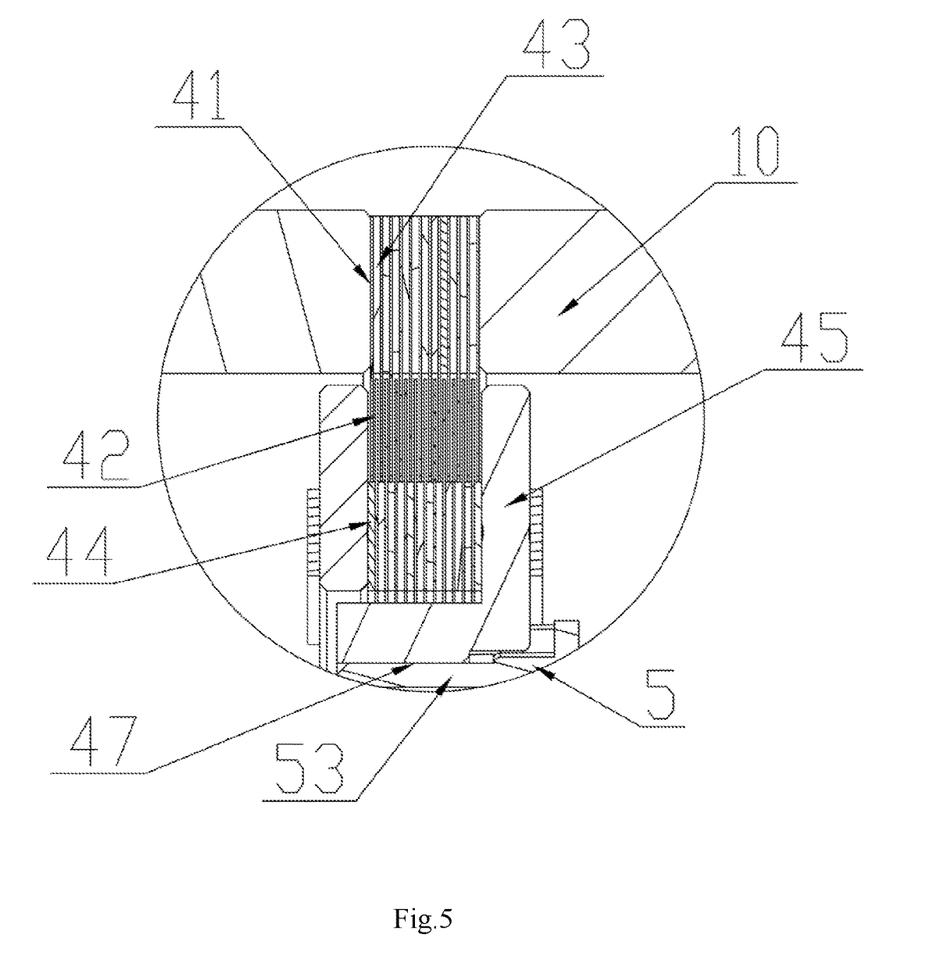
FIG. 5 is an enlarged view of the circle A of FIG. 4.
Figure 7:
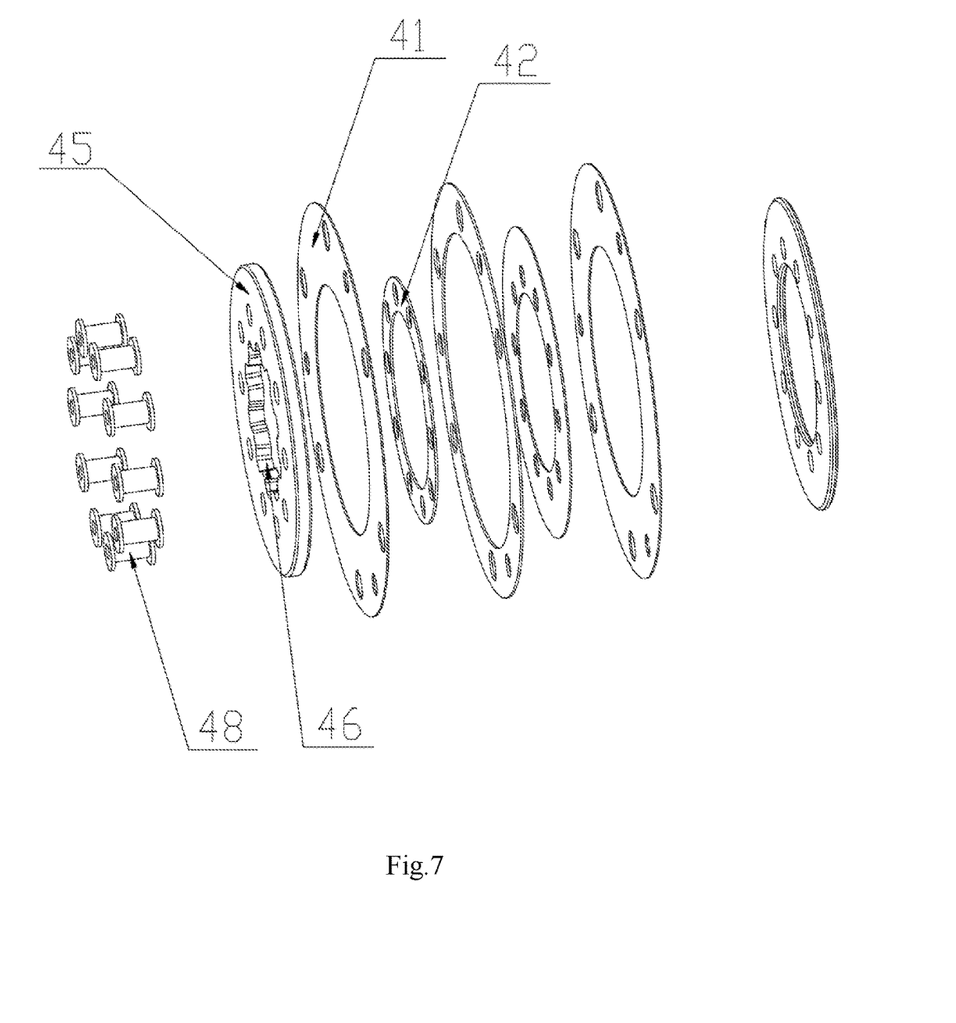
FIG. 7 is an exploded view of the damping disc of the damping mechanism of the camera tripod head of the present invention.

As shown in FIG. 5 and FIG. 7, the damping disc 4 includes at least two aforesaid outer rings 41 and at least one aforesaid inner ring 42. The inner ring 42 and a first partition ring 43 are disposed between every adjacent two of the outer rings 41. The inner diameter of the first partition ring 43 is greater than the outer diameter of the inner ring 42. The thickness of the first partition ring 43 is greater than the thickness of the inner ring 42. In the case of a plurality of inner rings 42, a second partition ring 44 is provided between every adjacent two of the inner rings 42. The outer diameter of the second partition ring 44 is less than the inner diameter of the outer ring 41. The thickness of the second partition ring 44 is greater than the thickness of the outer ring 41. The outer ring 41, the inner ring 42, the first partition ring 43, and the second partition ring 44 are coaxially disposed. The damping force of each damping disc may be the same or different. The damping force depends on the number of the inner rings and the outer rings. The greater the number of the inner rings and the outer rings, the greater the damping force. The less the number of the inner rings and the outer rings, the less the damping force.

The first partition ring 43 and the outer ring 41 are fixedly connected to the rotary seat 3. The second partition ring 44 and the inner ring 42 are fixedly connected to a positioning ring 45 by rivets 48. The positioning ring 45 and the inner ring 42 are coaxially disposed.

The stop block 5 is evenly formed with a plurality of first bevel teeth 51. The positioning ring 45 of the damping disc 4 is evenly formed with a plurality of second bevel teeth 46 to mesh with the first bevel teeth 51, so that the stop block and the inner ring of the damping disc are kept relatively static to generate a damping force.

The stop block 5 is coaxially provided with a positioning collar 53. The positioning ring 45 is formed with a positioning hole 47. The positioning collar 53 is inserted into the positioning hole 47, thereby providing a positioning function.

The end of the seesaw plate 82, leaning against the cam 84, is hingedly connected with a roller 85. The outer surface of the roller 85 extends beyond the seesaw plate 82 to lean against the cam 84. When the cam is turned, the roller is free to rotate so as to reduce rigid impact and friction loss, thereby prolonging the service life and increasing hand feel when shifted and raised.

The roller 85 is made of copper to reduce the friction loss and further increase hand feel when raised.

The stop block 5 is provided with a slide shaft 91. The fixing block 6 is formed with a slide hole 92. The slide shaft 91 is inserted in the slide hole 92 so as to eliminate the gap generated during rotation and to ensure that the stop block is free to be engaged or disengaged.

The slide shaft and the slide hole may be more than one in number, and are evenly arranged.

The fixing block 6 is threadedly connected with a pin 93. The pin 93 leans against the outer circumferential surface of the slide shaft 91 and can be used to lock the stop block.

The spindle 1 is a non-circular spindle. The stop block 5 is formed with a non-circular hole 52 cooperating with the non-circular spindle to ensure that the stop block won't be rotated relative to the spindle, so that the inner rings and the outer rings of the damping disc are relatively rotated to generate a damping force. The non-circular spindle may be an elliptical spindle, a square spindle, or the like. The non-circular hole is matched with the non-circular spindle.

A press ring 10 is provided between every adjacent two of the damping discs 4 to separate the damping discs from each other. The press ring is fixedly connected to the rotary seat, that is, it is also fixedly connected to the outer ring of the damping disc 4.

There are two rotary seats 3 respectively located at the front and rear of the plurality of damping discs. The rotary seats are supported on the aforesaid pitching rotary seat or the horizontal rotary seat by a bearing 13.

A locking device is provided between the rotary seat 3 and the fixing seat 2. The locking device includes a locking disc 11 fixedly connected to the rotary seat 3 and a locking block 12 connected to the fixing seat 2 by an adjustment screw (not shown). The locking block 12 is formed with a locking trough 121. The locking disc 11 is inserted in the locking trough 121. The width of the locking trough 121 is greater than the width of the locking disc 11 to facilitate locking of the rotary seat, so that the rotary seat won't rotate relative to the fixing seat. The swivel seat does not rotate relative to the mount. When locked, by rotating the adjustment screw, the locking block is driven to move along the axis of the locking disc until the end face of the locking trough is against the surface of the locking disc to achieve locking of the locking device.

The surface of the locking block 12 is formed with a guide groove 122. The fixing seat is fixedly connected with a guide rod (not shown). The guide rod is inserted in the guide groove to prevent the locking block from rotating with the adjustment screw and to provide a guiding function for the locking block.

Figure 6:
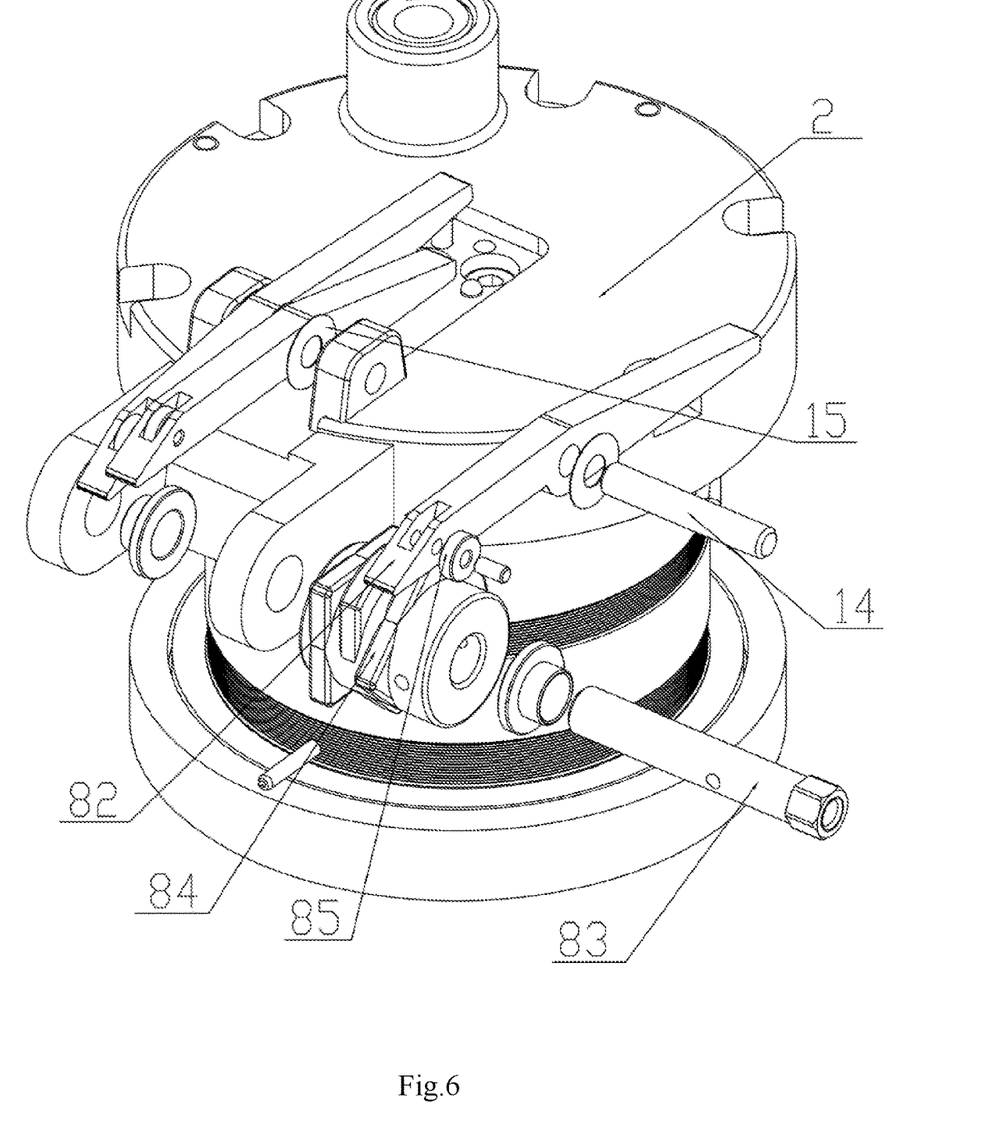
FIG. 6 is a partially exploded view of the damping mechanism of the camera tripod head of the present invention.

As shown in FIG. 6, the seesaw plate 82 of each drive device is hinged to the fixing seat 2 through a mounting shaft 14. A partition 15 is provided between every adjacent two of the seesaw plates 82. The partition 15 is fitted on the mounting shaft. The partition is a copper plate to avoid close contact and interference of the seesaw plates to ensure that the free adjustment of each drive device.

When the damping force is removed, the corresponding cam is turned to lift one end of the seesaw plate, and the other end of the seesaw plate pushes the push lever so as to force the stop block to overcome the force of the springs and to slide toward the fixing block until it is completely disengaged from the inner ring of the damping disc. For increasing the damping force, the corresponding cam is turned, and the stop block under the action of the springs is returned to engage with the damping disc. The user may turn multiple cams simultaneously so that the damping force may have different combinations. The damping mechanism of the present invention can be shifted and adjusted conveniently and accurately and won't be damaged easily.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A damping mechanism of a camera tripod head, comprising a fixing seat, a spindle fixedly connected to a middle portion of the fixing seat, a plurality of damping devices fitted on the spindle in order, and a rotary seat disposed coaxially with the fixing seat, the rotary seat being rotated about an axis of the spindle; the damping devices each comprising a damping disc, a stop block fitted on the spindle, and a drive device for pushing the stop block to slide along the spindle, the damping disc including an inner ring connected with the stop block and an outer ring fixedly connected with the rotary seat, the stop block being movable to disengage from the inner ring of the damping disc under the action of the drive device; the drive device including a push lever for pushing the stop block to slide, a seesaw plate having a middle portion hinged to the fixing seat, and a cam mounted on the fixing seat through a fixing shaft, one end of the push lever leaning against the stop block, the cam being turned about an axis of the fixing shaft, one end of the seesaw plate leaning against another end of the push lever, another end of the seesaw plate leaning against the cam.

2. The damping mechanism as claimed in claim 1, wherein each of the damping devices further includes a fixing block fixedly connected to the spindle, the stop block is disposed between the damping disc and the fixing block, a spring is provided between the stop block and the fixing block, and the stop block is movable to slide along the spindle under the action of the spring to engage with the inner ring of the damping disc.

3. The damping mechanism as claimed in claim 1, wherein the damping disc includes at least two said outer rings and at least one said inner ring, the inner ring is disposed between the two outer rings, the outer rings are fixedly connected to the rotary seat, and the inner ring is fixedly connected to a positioning ring by rivets.

4. The damping mechanism as claimed in claim 3, wherein the stop block is evenly formed with a plurality of first bevel teeth, and the positioning ring of the damping disc is evenly formed with a plurality of second bevel teeth to mesh with the first bevel teeth.

5. The damping mechanism as claimed in claim 3, wherein the stop block is coaxially provided with a positioning collar, and the positioning ring is formed with a positioning hole to mate with the positioning collar.

6. The damping mechanism as claimed in claim 1, wherein the end of the seesaw plate, leaning against the cam, is hingedly connected with a roller, and an outer surface of the roller extends beyond the seesaw plate to lean against the cam.

7. The damping mechanism as claimed in claim 1, wherein the stop block is provided with a slide shaft, the fixing block is formed with a slide hole, and the slide shaft is inserted in the slide hole.

8. The damping mechanism as claimed in claim 7, wherein the fixing block is threadedly connected with a pin, and the pin leans against an outer circumferential surface of the slide shaft.

9. The damping mechanism as claimed in claim 1, wherein a locking device is provided between the rotary seat and the fixing seat, the locking device includes a locking disc fixedly connected to the rotary seat and a locking block connected to the fixing seat by an adjustment screw, the locking block is formed with a locking trough, the locking disc is inserted in the locking trough, and the locking trough has a width greater than that of the locking disc.

10. The damping mechanism as claimed in claim 1, wherein the seesaw plate of each of the drive devices is hinged to the fixing seat through a mounting shaft, and a partition is provided between every adjacent two of the seesaw plates of the damping devices.

\* \* \* \* \*